(12) United States Patent
Li

(10) Patent No.: US 9,050,546 B2
(45) Date of Patent: Jun. 9, 2015

(54) WATERPROOF AND SALT REPELLANT MEDIA AND FILTER

(71) Applicant: TDC Filter Manufacturing, Inc., Niles, IL (US)

(72) Inventor: Yu Li, Bolingbrook, IL (US)

(73) Assignee: TDC Filter Manufacturing, Inc., Niles, IL (US)

( * ) Notice: Subject to any disclaimer, the term of this patent is extended or adjusted under 35 U.S.C. 154(b) by 100 days.

(21) Appl. No.: 13/727,878

(22) Filed: Dec. 27, 2012

(65) Prior Publication Data

US 2013/0174736 A1    Jul. 11, 2013

Related U.S. Application Data

(60) Provisional application No. 61/583,426, filed on Jan. 5, 2012.

(51) Int. Cl.
   *B01D 39/16*   (2006.01)
   *B01D 53/22*   (2006.01)

(52) U.S. Cl.
   CPC .......... *B01D 39/1623* (2013.01); *B01D 53/228* (2013.01); *B01D 2239/0672* (2013.01); *B01D 2239/0654* (2013.01); *B01D 2275/10* (2013.01); *B01D 39/1692* (2013.01); *B01D 2239/0622* (2013.01); *B01D 2239/0627* (2013.01); *B01D 2239/065* (2013.01)

(58) Field of Classification Search
   CPC ............. B01D 39/1623; B01D 46/546; B01D 2239/065; B01D 2239/0672; B01D 2239/0677; B01D 2275/10; B01D 2239/0622; B01D 2239/0627; B01D 2239/064; B01D 2239/0654

USPC .................................... 55/486, 487, 527, 528
See application file for complete search history.

(56) References Cited

U.S. PATENT DOCUMENTS

| | | |
|---|---|---|
| 2,308,310 A | 1/1943 | Ruemelin, Jr. et al. |
| 2,338,504 A | 1/1944 | Foster |
| 2,574,412 A | 11/1951 | Pringle |
| 3,078,650 A | 2/1963 | Anderson et al. |
| 3,097,410 A | 7/1963 | Lincoln |
| 3,170,777 A | 2/1965 | Held |
| 3,186,551 A | 6/1965 | Dornauf |
| 3,361,260 A | 1/1968 | Buckman |
| 3,420,377 A | 1/1969 | Vandersip |

(Continued)

FOREIGN PATENT DOCUMENTS

| | | |
|---|---|---|
| EP | 1062997 A2 | 12/2000 |
| WO | 9836819 A1 | 8/1998 |

(Continued)

OTHER PUBLICATIONS

International Preliminary Report on Patentability for PCT/US2012/071746 mailed Jul. 17, 2014 (5 pages).

(Continued)

*Primary Examiner* — Robert Clemente
(74) *Attorney, Agent, or Firm* — Nixon Peabody LLP

(57) ABSTRACT

A waterproof and salt repellant media for use in a gas turbine intake filter is provided. The media includes a first composite material layer having a polypropylene melt-blown layer and a polypropylene spun-bond layer, and a second composite material layer having a polyester spun-bond material coated with PTFE.

18 Claims, 1 Drawing Sheet

(56) References Cited

U.S. PATENT DOCUMENTS

| | | | |
|---|---|---|---|
| 3,538,687 A | 11/1970 | Pausch | |
| 3,577,486 A | 5/1971 | Sebok | |
| 3,618,300 A | 11/1971 | Pausch | |
| 4,007,026 A | 2/1977 | Groh | |
| 4,015,961 A | 4/1977 | Howard et al. | |
| D244,533 S | 5/1977 | Eidelberg et al. | |
| 4,042,356 A | 8/1977 | Miller | |
| 4,073,632 A | 2/1978 | Reinauer et al. | |
| 4,127,706 A | 11/1978 | Martin et al. | |
| 4,194,894 A | 3/1980 | Noland | |
| 4,204,846 A | 5/1980 | Brenholt | |
| 4,209,310 A | 6/1980 | Berkhoel | |
| 4,218,227 A | 8/1980 | Frey | |
| 4,220,459 A | 9/1980 | Hammond et al. | |
| 4,266,954 A | 5/1981 | Oare et al. | |
| 4,272,263 A | 6/1981 | Hancock | |
| 4,289,511 A | 9/1981 | Johnson, Jr. | |
| 4,291,904 A | 9/1981 | Iversen et al. | |
| 4,292,057 A | 9/1981 | Ulvestad et al. | |
| 4,306,893 A | 12/1981 | Fernando et al. | |
| 4,310,336 A | 1/1982 | Peterson | |
| 4,322,231 A | 3/1982 | Hilzendeger et al. | |
| 4,344,718 A | 8/1982 | Taylor | |
| 4,345,924 A | 8/1982 | Margraf | |
| 4,395,269 A | 7/1983 | Schuler | |
| 4,424,070 A | 1/1984 | Robinson | |
| 4,435,197 A | 3/1984 | Nijhawan et al. | |
| 4,436,536 A | 3/1984 | Robinson | |
| 4,443,237 A | 4/1984 | Ulvestad | |
| 4,445,915 A | 5/1984 | Robinson | |
| D285,109 S | 8/1986 | Jornhagen | |
| D285,247 S | 8/1986 | Jornhagen | |
| 4,704,144 A | 11/1987 | LeBlanc et al. | |
| 4,775,398 A | 10/1988 | Howeth | |
| 4,820,320 A | 4/1989 | Cox | |
| 4,871,380 A | 10/1989 | Meyers | |
| 4,955,996 A | 9/1990 | Edwards et al. | |
| 5,057,131 A | 10/1991 | Lackner et al. | |
| 5,061,303 A | 10/1991 | Williams et al. | |
| 5,062,872 A | 11/1991 | Williams | |
| 5,066,318 A | 11/1991 | McDonough | |
| D334,051 S | 3/1993 | Fell, Sr. | |
| 5,290,441 A | 3/1994 | Griffin et al. | |
| 5,308,369 A | 5/1994 | Morton et al. | |
| 5,308,485 A | 5/1994 | Griffin et al. | |
| 5,487,767 A | 1/1996 | Brown | |
| 5,536,290 A | 7/1996 | Stark et al. | |
| 5,562,746 A | 10/1996 | Raether | |
| 5,587,071 A | 12/1996 | Belden | |
| 5,613,992 A | 3/1997 | Engel | |
| D379,493 S | 5/1997 | Woods | |
| 5,632,791 A | 5/1997 | Oussoren et al. | |
| 5,730,766 A | 3/1998 | Clements | |
| 5,746,792 A | 5/1998 | Clements et al. | |
| 5,785,724 A | 7/1998 | Johnson | |
| 5,803,941 A | 9/1998 | Berkhoel et al. | |
| 5,885,314 A | 3/1999 | Oussoren et al. | |
| 5,895,510 A | 4/1999 | Butler et al. | |
| 5,897,676 A | 4/1999 | Engel et al. | |
| 5,938,804 A | 8/1999 | Engel et al. | |
| 5,954,849 A | 9/1999 | Berkhoel et al. | |
| 5,964,909 A | 10/1999 | Brunner | |
| 5,972,059 A | 10/1999 | Morgan | |
| 6,017,378 A | 1/2000 | Oussoren et al. | |
| D437,034 S | 1/2001 | Stout, Jr. | |
| 6,203,591 B1 | 3/2001 | Clements et al. | |
| 6,214,077 B1 | 4/2001 | Bitner et al. | |
| RE37,163 E | 5/2001 | Oussoren et al. | |
| D449,621 S | 10/2001 | Hamlin | |
| 6,299,662 B1 | 10/2001 | Poulsen | |
| 6,322,602 B2 | 11/2001 | Engel et al. | |
| 6,358,292 B1 | 3/2002 | Clements | |
| 6,364,921 B1 | 4/2002 | Raether et al. | |
| 6,368,388 B1 | 4/2002 | Kosmider et al. | |
| 6,368,390 B1 | 4/2002 | Bitner et al. | |
| 6,387,162 B1 | 5/2002 | Kosmider et al. | |
| 6,447,566 B1 | 9/2002 | Rivera et al. | |
| 6,488,746 B1 | 12/2002 | Kosmider et al. | |
| 6,511,599 B2 | 1/2003 | Jaroszczyk et al. | |
| 6,569,219 B1 | 5/2003 | Connor et al. | |
| 6,579,348 B1 | 6/2003 | Winter et al. | |
| 6,626,970 B2 | 9/2003 | Pipkorn et al. | |
| 6,706,087 B1 | 3/2004 | Gebler et al. | |
| 6,712,870 B1 | 3/2004 | Stamey, Jr. et al. | |
| 6,726,735 B1 | 4/2004 | Oussoren et al. | |
| 6,790,250 B2 | 9/2004 | Pipkorn et al. | |
| 6,858,052 B2 | 2/2005 | Clements | |
| D513,072 S | 12/2005 | Berg | |
| 6,974,491 B1 | 12/2005 | Kendall | |
| D515,675 S | 2/2006 | Tremoulet, Jr. et al. | |
| D518,885 S | 4/2006 | Stout, Jr. et al. | |
| 7,063,730 B2 | 6/2006 | Connor et al. | |
| D534,253 S | 12/2006 | Sandman et al. | |
| 7,186,284 B2 | 3/2007 | Clements | |
| 7,264,656 B2 | 9/2007 | Kosmider et al. | |
| D553,238 S | 10/2007 | Haggkvist | |
| 7,294,161 B2 | 11/2007 | Connor et al. | |
| D556,867 S | 12/2007 | Darce | |
| D557,387 S | 12/2007 | Darce | |
| D557,771 S | 12/2007 | Darce | |
| 7,323,106 B2 | 1/2008 | Jaroszczyk et al. | |
| D572,348 S | 7/2008 | Arosio | |
| 7,404,839 B2 | 7/2008 | Modesto et al. | |
| D574,934 S | 8/2008 | Darce et al. | |
| 7,501,003 B2 | 3/2009 | Muller et al. | |
| D598,988 S | 8/2009 | Jaccoby et al. | |
| 7,597,734 B2 | 10/2009 | Johnson et al. | |
| D605,739 S | 12/2009 | Henry et al. | |
| 7,670,398 B2 | 3/2010 | Modesto | |
| 7,670,403 B2 | 3/2010 | Modesto et al. | |
| 7,740,678 B2 | 6/2010 | Gunderson et al. | |
| D626,208 S | 10/2010 | Clements | |
| D631,142 S | 1/2011 | Angell | |
| D638,523 S | 5/2011 | Yoshida et al. | |
| 7,942,948 B2 | 5/2011 | Smithies et al. | |
| D646,764 S | 10/2011 | Rusconi | |
| D650,053 S | 12/2011 | Douglass, III | |
| 8,147,583 B2 | 4/2012 | Gebert et al. | |
| 8,157,880 B2 | 4/2012 | Muenkel | |
| 8,308,834 B2 | 11/2012 | Smithies et al. | |
| D698,017 S | 1/2014 | Modesto | |
| 8,636,833 B2 * | 1/2014 | Jones et al. | 95/287 |
| 2004/0237483 A1 | 12/2004 | Clements | |
| 2005/0055989 A1 | 3/2005 | Morgan | |
| 2006/0060085 A1 * | 3/2006 | Ptak et al. | 96/69 |
| 2006/0137317 A1 | 6/2006 | Bryner et al. | |
| 2007/0158277 A1 | 7/2007 | Bachand et al. | |
| 2008/0302074 A1 | 12/2008 | Gebert et al. | |
| 2008/0302242 A1 | 12/2008 | Schelling et al. | |
| 2009/0047435 A1 | 2/2009 | Hutchenson et al. | |
| 2009/0249956 A1 | 10/2009 | Chi et al. | |
| 2009/0266048 A1 | 10/2009 | Schwarz | |
| 2010/0218471 A1 | 9/2010 | Smithies et al. | |
| 2010/0313533 A1 | 12/2010 | Muenkel | |
| 2011/0064928 A1 | 3/2011 | Bonneh | |
| 2011/0162336 A1 | 7/2011 | Poulsen | |
| 2011/0214570 A1 | 9/2011 | Jones et al. | |
| 2013/0139691 A1 | 6/2013 | Goldbach et al. | |

FOREIGN PATENT DOCUMENTS

| | | |
|---|---|---|
| WO | 2006012495 A1 | 2/2006 |
| WO | 2006096180 A1 | 9/2006 |
| WO | 2007109563 A2 | 9/2007 |
| WO | 2007109563 A3 | 9/2007 |
| WO | 2007145774 A1 | 12/2007 |
| WO | 2008153878 A1 | 12/2008 |
| WO | 2012002754 A1 | 1/2012 |
| WO | 2013103572 A1 | 7/2013 |

OTHER PUBLICATIONS

International Search Report for PCT/US2014/010829 mailed Apr. 10, 2014 (3 pages).

(56) References Cited

OTHER PUBLICATIONS

Written Opinion of International Searching Authority for PCT/US2014/010829 mailed Apr. 10, 2014 (5 pages).

AK Industries, Inc.; 2002 Catalog for "Poly Sump & Sewage Basins"; cover page, copyright page, and p. 10 (3 pages total); dated Jun. 2002.

Kleissler Company; "Removal / Replacement of Filter Tube," from Operating and Maintenance Manual; May 30, 2000; retrieved from file for Reexamination No. 95/000,646 (1 page).

Examiner's Decision in Reexamination No. 95/000,646; Jan. 12, 2012 (11 pages).

McMaster-Carr Supply Company; Catalog 107; cover page, copyright page, and p. 3280; 2002 (3 pages).

iFil USA, LLC; Requester's Replacement Statement and Explanation under 37 C.F.R. 1.915(b)(3) for Request for Inter Partes Reexamination in Reexamination No. 95/000,646; Feb. 11, 2012 (20 pages).

International Search Report and Written Opinion for PCT/US07/64207 mailed Oct. 16, 2007 (8 pages).

International Search Report and Written Opinion for PCT/US2012/71746 mailed Mar. 7, 2013 (6 pages).

AK industries, Inc.; Catalog: "Adaptaflex Fittings": date unknown; retrieved from file for Reexamination No. 95/000,646 (1 page).

Photographs of pipe filters attached as Exhibit A to Affidavit of J. Clements submitted on Apr. 9, 2012 in Reexamination No. 95/000,646 (2 pages).

Torit II, D.; "Downflo Oval 1 Dust Collectors"; published Sep. 1, 2002 (16 pages).

* cited by examiner

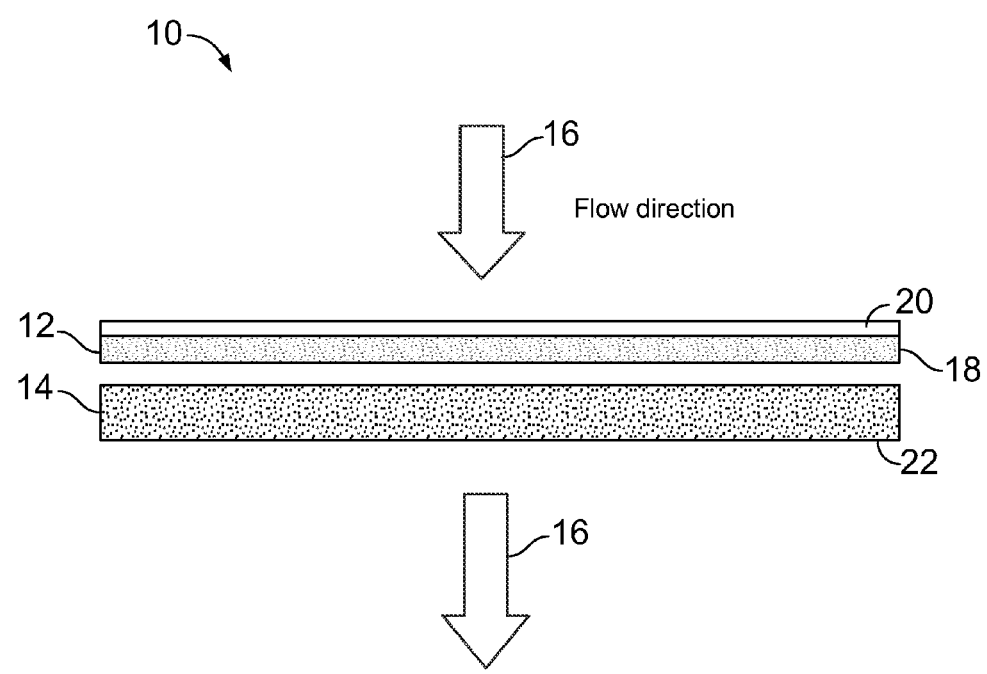

WATERPROOF AND SALT REPELLANT MEDIA AND FILTER

CROSS-REFERENCE TO RELATED APPLICATIONS

The present application claims the benefit of U.S. Provisional Application Ser. No. 61/583,426 filed Jan. 5, 2012, the contents of which are incorporated herein.

FEDERALLY SPONSORED RESEARCH OR DEVELOPMENT

N/A

FIELD OF THE INVENTION

The present invention generally relates to a waterproof and salt repellant media and a filter formed from the media.

DESCRIPTION OF THE PRIOR ART

A large variety of filters are utilized to remove particulates, pollutants and other undesirable materials from fluids, such as liquids or gas. The filters come in a variety of shapes and can include one of many types of filter media.

One known filter media is disclosed in U.S. Publication No. 2008/0302074 ("the '074 Publication"). The '074 Publication describes a multiple layer filter media for removing particulates from a fluid stream. The media includes a composite having a first thermoplastic layer, a second thermoplastic layer, and an expanded PTFE or ePTFE (expanded Polytetrafluoroethylene) membrane layer sandwiched between the first and second thermoplastic layers.

PTFE membranes are formed from stretching a PTFE film. Filters with PTFE membranes have several drawbacks. For example, PTFE membranes are very expensive. In this regard, the filter media disclosed in the '074 Publication is extremely expensive given the use of the PTFE membrane in the composite.

Filters are needed, in particular, for gas turbines. Such turbines include air-intake components. However, contaminates in the air can cause problems with the turbine if not removed. For example, small particles in the intake air may deposit on the blades of the turbine and cause fouling of the compressor. Accordingly, it is necessary to provide an adequate filter system to remove such pollutants.

The common contaminants come from three main sources: water, dust and emissions. These contaminants can cause erosion, fouling, particle fusion and corrosion. Particularly the present invention is used for coastal, marine or offshore applications in which a high concentration of moisture and salt exist in the atmosphere. Salt is a primary cause for corrosion in a gas turbine. Also, a high concentration of salt can lead to fouling of the compressor blades. Conventional high efficiency filters do not prevent water penetration. Therefore, the water can pass through the filter media to the inlet of the gas turbine. This water can dissolve dry salt particles into salt solution, and transfer them from one side of the filter to the other, releasing them into the gas turbine. Additionally, the moisture can load the filters causing a remarkably high pressure drop. It is critical to design a high efficiency filter with moisture resistant and water control.

The present invention is designed to overcome problems associated with prior designs and provide an enhanced media and filter for high concentration of moisture and salt applications.

SUMMARY OF THE INVENTION

The present invention provides a cost effective filter media that is waterproof and repels salt solutions. Moreover, the present invention provides low flow restriction and is low cost in comparison with existing filter technology.

The filter media of the present invention is particularly useful as a gas turbine air intake filter. Specifically, the filter is designed to remove water droplets and salt solutions that may occur in harsh conditions or environments, such as offshore platforms and tropical high moisture areas.

In accordance with an embodiment of the invention, a filter media is provided having a first composite material layer and a second composite material layer. The first composite material layer includes a melt-blown material layer and a spun-bond material layer. The second composite material layer includes a material with a hydrophobic coating.

In accordance with another embodiment of the invention, an improved filter media is provided having a first composite material layer and a second composite material layer. The first composite material layer includes a layer of polypropylene melt-blown and a layer of polypropylene spun-bond attached to the polypropylene melt-blown layer. The second composite material layer includes a polyester (i.e., PET) spun-bond with a hydrophobic treatment. Preferably, the hydrophobic treatment includes providing a hydrophobic coating, such as a PTFE coating, on the polyester spun-bond material. The hydrophobic coating provides a hydrophobic property such that salt water solution or tiny water aerosols will be stopped by the low surface tension of the media.

The first composite material layer is positioned on top of the second composite material layer. The filter media is positioned so that air flow contacts the top or first composite material layer first and then travels through the second composite material layer.

The composite material layers are bound together. Preferably, the composite material layers are laminated by an ultrasonic bonding technique.

The filter media can be pleated and be utilized in a filter cartridge. The filter cartridge housing the media can then be utilized in a variety of equipment, such as the air-intake of a gas turbine machine.

Coating the polyester layer with a hydrophobic coating, such as a PTFE coating, is less expensive than providing a full membrane layer of ePTFE. Accordingly, the cost of the present filter media is significantly less than the prior media utilizing ePTFE membranes. Such membranes can range from 4 to 10 times the cost of a polyester spunbond with a hydrophobic coating.

The hydrophobic coating can be one of two types. The coating can be a fluorochemical coating, or an organic silicone type coating.

Further aspects of the invention are disclosed in the description of the invention, including the Figures.

BRIEF DESCRIPTION OF THE DRAWINGS

To understand the present invention, it will now be described by way of example, with reference to the accompanying drawings in which:

FIG. 1 is a schematic diagram of a partially exploded cross-section of filter media made in accordance with the present invention, the diagram also showing the direction of airflow.

DETAILED DESCRIPTION

While this invention is susceptible of embodiments in many different forms, there is shown in the drawings what will herein be described in detail preferred embodiments of the invention with the understanding that the present disclosure is to be considered as an exemplification of the principles of the invention and is not intended to limit the broad aspect of the invention to the embodiments illustrated.

As illustrated in the partially exploded cross-sectional view of FIG. 1, a filter media 10 is provided having a first composite material layer 12 and a second composite material layer 14. Arrows 16 show the fluid flow direction through the composite material layers 12, 14 of the filter media 10. The filter media 10 is typically pleated for use in a filter cartridge or panel filter or holder.

The first composite material layer 12 can be a thermoplastic fibrous material forming a spun-bond scrim. The thermoplastic materials can be polypropylene, nylon, polyester or polyethylene. Preferably, the first composite material layer 12 is formed from a polypropylene melt-blown 18 and a polypropylene spun-bond 20 on top of the melt-blown. The polypropylene spun-bond layer 20 will protect the melt-blown layer 18 during pleating and handling of the material.

The polypropylene spun-bond layer 20 has a low surface energy. This will facilitate repelling water droplets.

The polypropylene melt-blown layer 18 functions to coalesce small water droplets into bigger droplets. Gravity then pulls the large droplets to drain down vertically from the filter media 10.

The melt-blown layer 18 also functions to trap contaminants. The melt-blown layer includes randomly laid small fibers, typically in the range of 1 to 7 microns. The fibers form a tortuous path and add depth to the composite material layer 12, which increases the contaminant holding capacity of the filter media 10.

The melt-blown layer 18 is formed to have a thickness of 0.40 to 0.70 millimeters (preferably 0.46 to 0.66 millimeters) and a basis weight of 10-60 grams per square meter (preferably 20-40 grams per square meter).

The second composite material layer 14 can be a thermoplastic fibrous media and wetlaid paper. The thermoplastic fibrous material can be spunbond, hydroentangles, and carded media. The material can be Polypropylene, Polyethylene, Polyester, and Nylon. The wetlaid paper can be fiberglass paper and cellulose paper. Preferably, the second composite layer 14 is formed from a polyester spun-bond with a hydrophobic treatment or coating 22. Preferably, the polyester spun-bond is coated with a hydrophobic coating, such as a PTFE coating having hydrophobic properties. The hydrophobic properties lower the surface tension of the material and increase water repellency.

There are several methods for coating the spun-bond media with a material having a hydrophobic property. In accordance with one method a fibrous media is immersed in a PTFE bath, that is, a solution containing fluorocarbon chemicals, and is then dried with heat.

The spun-bond media with hydrophobic coating has a water entry pressure greater than a 10 inch water column (W.G.). Preferably, the pressure is greater than 20 inch W.G.

The second composite material layer 14 is formed to a thickness of 0.30 to 0.50 millimeters (preferably 0.38 to 0.43 millimeters), and a basis weight of 70 to 300 grams per square meter (preferably 170 grams per square meter). The polyester layer with the hydrophobic coating has an air permeability of 10 to 50 cfm (preferably 23 cfm).

The first composite material layer 12 is bound together with the second composite material layer 14. Preferably, the first and second composite material layers 12, 14 are laminated together. This can be done with an ultra-sonic bonding technique.

Many modifications and variations of the present invention are possible in light of the above teachings. It is, therefore, to be understood within the scope of the appended claims the invention may be protected otherwise than as specifically described.

I claim:

1. A filter for use in a turbine comprising:
    a filter cartridge having a filter media including:
    a first outer upstream composite material layer including an inner layer of melt-blown material and an outer layer of spun-bond material; and,
    a second inner downstream composite material layer including a spun-bond polyester having a hydrophobic coating, the inner downstream layer being protected by the outer upstream layer.

2. The filter of claim 1 wherein the melt-blown material is polypropylene.

3. The filter of claim 1 wherein the outer layer of spun-bond material of the first outer composite material layer is polyester.

4. The filter of claim 1 wherein the hydrophobic coating is PTFE.

5. The filter of claim 1 wherein the first composite material layer is bound to the second composite material layer.

6. The filter of claim 5 wherein the first composite material layer is laminated to the second composite material layer.

7. The filter of claim 6 wherein the first composite material layer is laminated to the second composite material layer by an ultrasonic bonding technique.

8. The filter of claim 1 wherein the media is positioned for airflow to proceed through the first composite material layer and then through the second composite material layer.

9. The filter of claim 1 wherein the first composite material layer and the second composite material layer are formed into a cylindrical shape.

10. The filter of claim 1 wherein the melt-blown layer has a thickness of about 0.40 to 0.70 millimeters.

11. The filter of claim 10 wherein the second composite material has a thickness of about 0.30 to 0.50 millimeters.

12. The filter of claim 4 wherein the second composite material layer has an air permeability of about 10 to 50 cfm.

13. A filter media for an air-intake system comprising:
    a first upstream composite material layer including an inner polypropylene melt-blown layer and an outer polypropylene spun-bond material; and
    a second downstream composite material layer including a polyester spun-bond material coated with a hydrophobic coating, the second downstream composite layer being protected by the first upstream composite layer.

14. The filter media of claim 13 wherein the first composite material layer is bound to the second composite material layer.

15. The filter media of claim 13 wherein the first composite material layer is laminated to the second composite material layer.

16. The filter media of claim 15 wherein the first composite material layer is laminated to the second composite material layer by an ultrasonic bonding technique.

17. The filter media of claim 13 wherein the media is positioned for airflow to proceed through the first composite material layer and then through the second composite material layer.

18. The filter media of claim 13 wherein the hydrophobic coating is a PTFE coating.

* * * * *